Feb. 23, 1954 W. S. WATROUS 2,669,826
LAWN MOWER OF THE ROTATING SICKLE TYPE
Filed Feb. 16, 1949 3 Sheets-Sheet 2

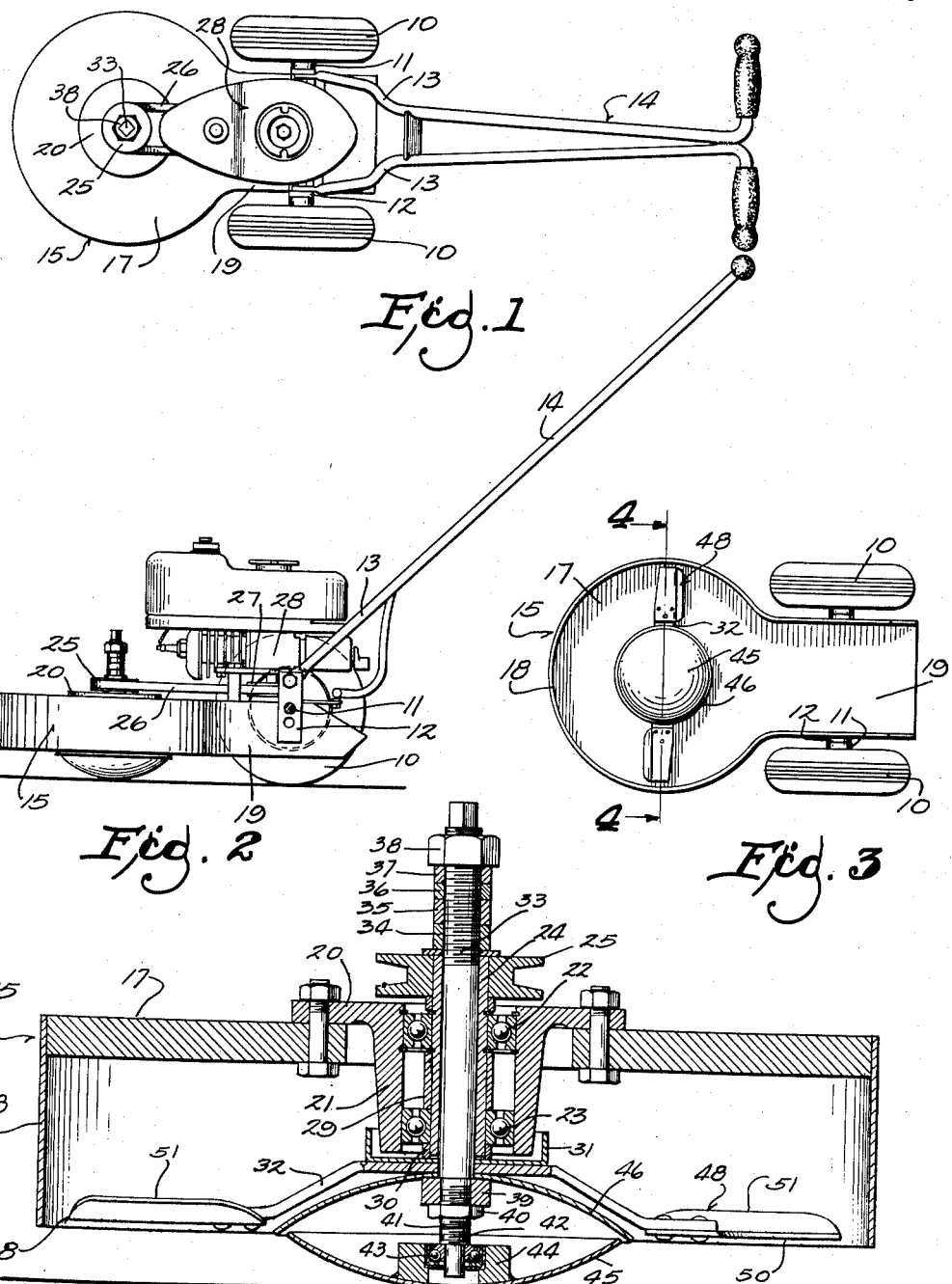

Inventor
WINSTON S. WATROUS
By Wheeler, Wheeler & Wheeler
Attorneys

Feb. 23, 1954  W. S. WATROUS  2,669,826
LAWN MOWER OF THE ROTATING SICKLE TYPE
Filed Feb. 16, 1949  3 Sheets-Sheet 3
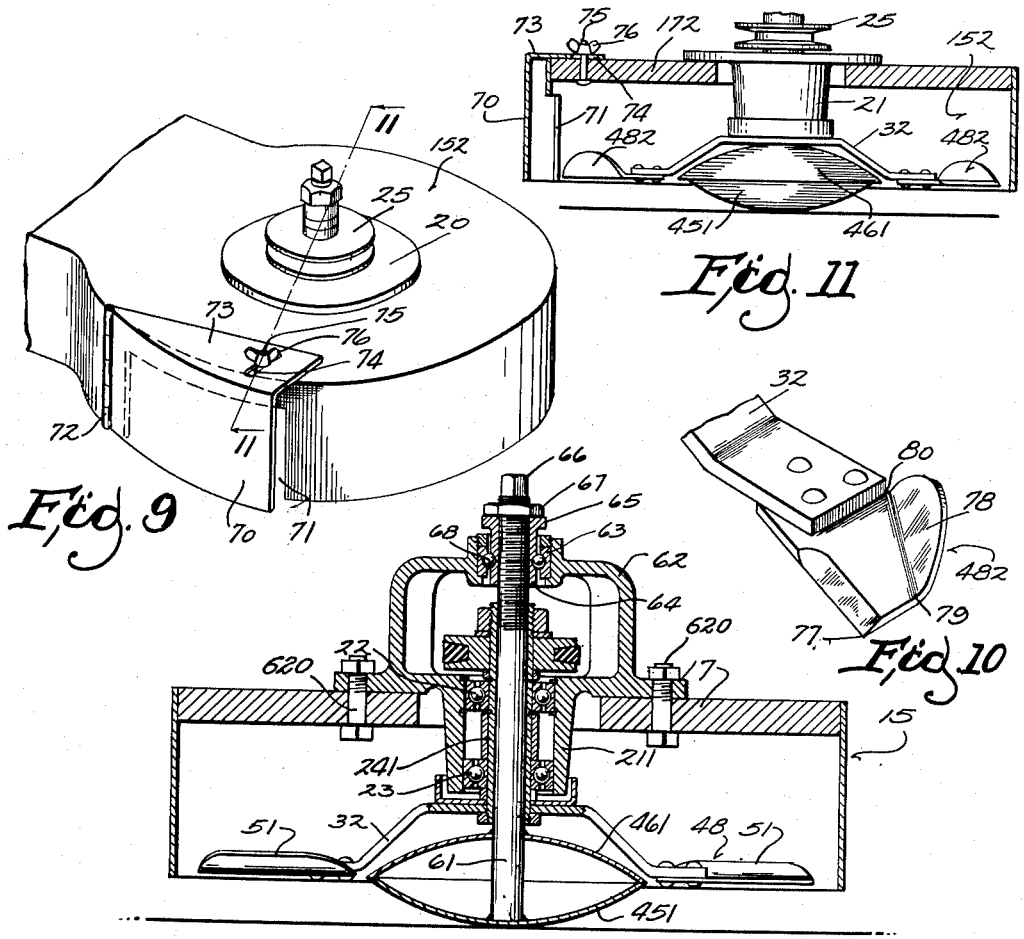
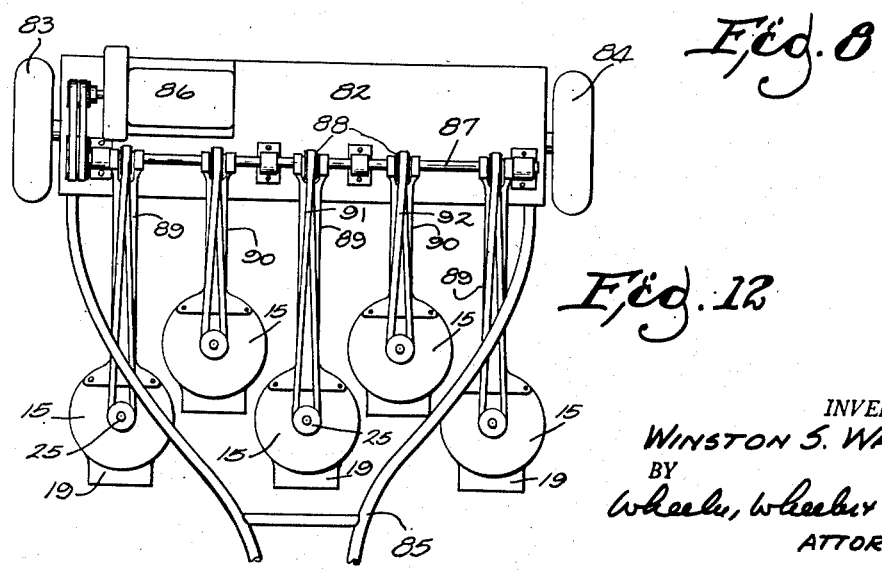
INVENTOR.
WINSTON S. WATROUS
BY
Wheeler, Wheeler & Wheeler
ATTORNEYS Patented Feb. 23, 1954

2,669,826

UNITED STATES PATENT OFFICE 2,669,826

LAWN MOWER OF THE ROTATING SICKLE TYPE

Winston S. Watrous, Milwaukee, Wis.

Application February 16, 1949, Serial No. 77,021

32 Claims. (Cl. 56—25.4)

This invention relates to a lawn mower of the rotating sickle type.

It is a primary object of the invention to provide a mower of the aforesaid type which is nearly in balance upon supporting wheels located at the rear of its cutting blade, the blade itself being provided with a swiveled symmetrical support which positively precludes "scalping" without in any manner interfering with free movement in all directions other than downwardly.

It is a further major objective of the present invention to provide novel and improved means for swinging the entire cutting head from side to side with respect to the rear wheels and handle, thus permitting wide spacing of the rear wheels for greater stability while nevertheless facilitating the use of the device for trimming purposes by permitting the blades to be moved from their normal symmetrical or center position to one side or the other of the path of the rear wheels, subject to the instant control of the operator. The swiveled shoe aforesaid is important to this movement.

A further major objective of the invention is an arrangement whereby a combination of a special blade formed with a special housing structure adapts the more to receive grass and weeds from the side of the housing. This is extremely important for the purpose of trimming in immediate proximity to fixed objects such as fences, trees, buildings, tombstones and the like, since one or more stems or blades of grass in immediate proximity to a fixed obstacle may be completely inaccessible to a conventional mower of this type but can readily be cut through the use of this feature. A mower equipped with this special mechanism completely eliminates the need for any extra trimming.

The manner in which these objectives are achieved will appear more particularly from the following disclosure of the invention with reference to the accompanying drawing in which:

Fig. 1 is a plan view of a device embodying my invention in its simplest aspect.

Fig. 2 is a view in side elevation of the device shown in Fig. 1.

Fig. 3 is a fragmentary detail view in inverted plan of the device shown in Fig. 1 and Fig. 2.

Fig. 4 is an enlarged detail view in cross section on the line 4—4 of Fig. 3.

Fig. 8 is an enlarged detail view in transverse cross section showing a modified mounting for a supporting shoe in accordance with this invention.

Fig. 9 is a fragmentary detail view in perspective showing a housinng modified for use in trimming in accordance with a feature of this invention.

Fig. 10 is a fragmentary detail view in perspective showing a special blade form desirably used in conjunction with the housing of Fig. 9.

Fig. 11 is a fragmentary detail view in transverse cross section through the housing of Fig. 9 and along the line 11—11 thereof, and showing in association therewith the blade of Fig. 10.

Fig. 12 is a fragmentary detail view in plan showing the application of this invention to a lawn mower such as is employed for parks or golf courses or the like.

Figure 5:
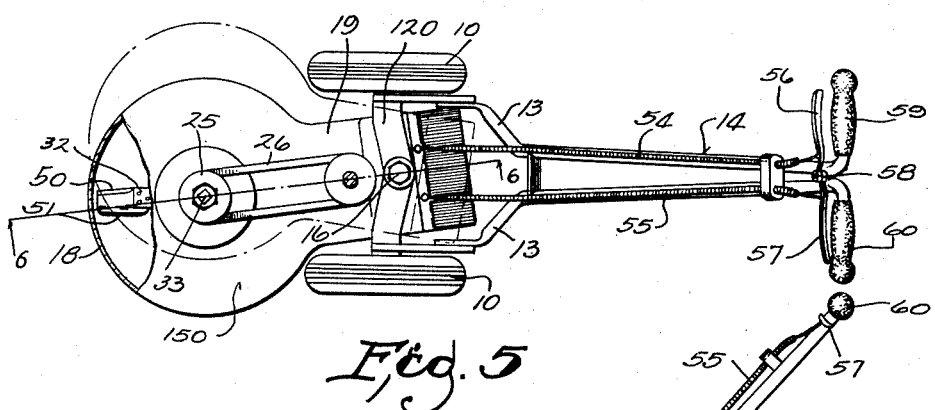
Fig. 5 shows a modified embodiment of the invention as it appears in plan with the engine removed.

Although the invention herein disclosed is applicable in all respects to lawn mowers of the type in which the ground wheels are power-propelled, I have chosen, for the sake of simplicity, to show a construction in which only the blades are power propelled, the ground wheels 10 being free to rotate on the stub axles 11 carried by a yoke 12 with which the forks 13 of the handle 14 are connected.

In the construction shown in Figs. 1 to 4, the housing 15 is rigidly connected with the axle yoke. In the construction shown in Figs. 5 to 7, the axle yoke 120 and the housing 150 are pivotally connected by means of a pintle bolt at 16. In other respects, the housing is substantially the same in these embodiments. It comprises a flat top wall at 17 and a generally cylindrical side wall at 18 provided with a generally radial extension channel 19 rearwardly between the wheels as best shown in Fig. 3.

The top wall is apertured, the aperture being spanned by a mounting plate 20 which is bolted or otherwise secured to the aperture margins. Sleeve 21, integral with this plate (Fig. 4) carries the outer races of the anti-friction bearings 22, 23, for the support of the tubular drive shaft 24. The pulley 25 on this shaft is driven by belt 26 from the pulley 27 on the crank shaft of engine 28.

The tubular shaft 24 is encircled by a collar 29 between the inner races of bearings 22 and 23 and another collar at 30 against which seats the cup 31 mounted centrally on the blade carrying arm 32. This arm rotates with the shaft, being clamped thereto by means of bolt 33 extending through the tubular shaft 24 and adjustable by means of washers 34, 35, 36, 37 (Fig. 4), held by a nut 38, threaded to the bolt. By removing washers above the pulley 25 and adding them below the blade carrying arm 32, the height of the cutter arm 32 may be varied, to vary the cut. The interchange of washers between a position above the pulley and a position below the arm 32 has the effect of varying, with respect to arm 32, the position of the ground support now to be described.

In effect, the bolt 33 is a part of the tubular shaft 24, since it rotates unitarily therewith. At the lower end of bolt 33 I provide, first of all, a head against which the blade carrying arm 32 is clamped. This head may conveniently comprise a nut 39 secured by lock nut 40. An extension 41 of the bolt projects below the lock nut and is shouldered at 42 to receive, with pressed fit, the inner race of a bearing 43, whose outer race is socketed, with pressed fit, in the hub 44 of a downwardly convex shoe 45, which is preferably spherical and, whether or not spherical, is convex and symmetrical with reference to the axis of the shaft, providing direct support for the shaft from the ground to limit the approach to the ground of the blades carried by the shaft and hereinafter described.

Since the shoe or skid 45 is downwardly convex, it is necessarily concave in an upward direction. To avoid accumulation of grass clippings and other debris therein, it is preferred to apply over it a baffle 46 which is clamped between the bolt head 39 and the blade carrying arm 32. The baffle need not fit closely to the shoe since it discharges centrifugally any clippings or other material which is contacts. Any washers used below the blade will be inserted between the baffle 46 and arm 32.

Each blade 48 is desirably beveled upwardly to provide a cutting edge at 50 and each desirably has an upwardly turned rear margin at 51. Both the bevel and the upwardly turned rear margin operate to produce an upward current of air within the cylindrical housing 18, such current being delivered rearwardly through channel 19. The upward current lifts grass blades and the leaves of weeds and tends to hold these under upward tension while the cutting edges 50 effect severance at the required spacing from the ground.

The convex skid 45 supports the mowing head at a fixed distance above the ground, the distance being adjustably determined by the positions of the washers 34, 35, 36, 37. The action of this skid in traversing the ground seems to be even more easy and frictionless than the action of wheels or rollers. The shoe instantly accommodates itself to changes in direction, tending to rotate upon its axis (which is also the axis of the blade carrying shaft) when minor irregularities are encountered. Since the shoe is always symmetrical with respect to the axis upon which the cutting blades rotate, it is impossible for the device to get out of balance. It does not incline one way or the other. In actual practice, the blades never cut into or "scalp" the sod.

Figure 6:
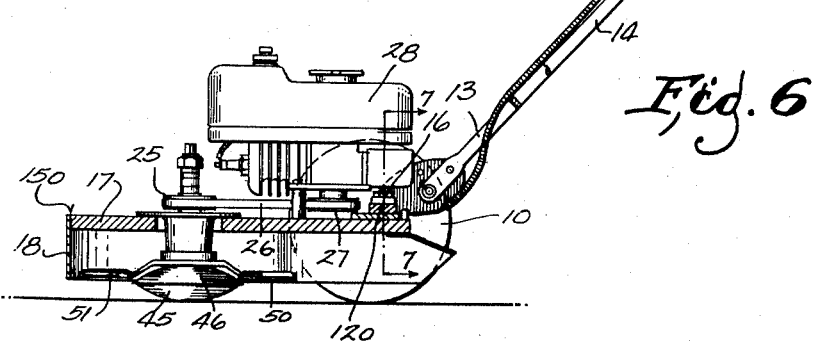
Fig. 6 is a view partially in side elevation and partially in longitudinal section along the line 6—6 of Fig. 5 and showing the embodiment of Fig. 5.
Figure 7:
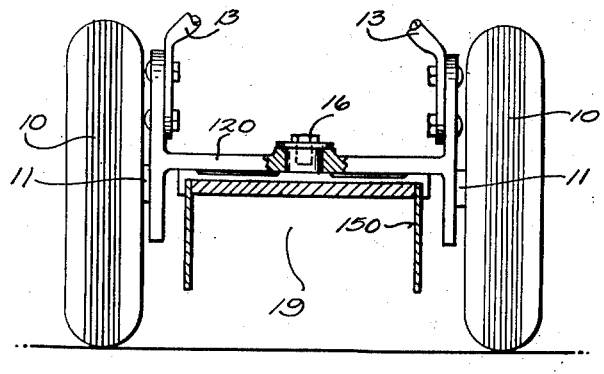
Fig. 7 is an enlarged fragmentary detail view in transverse section through the fulcrum between the wheel frame and the cutting head of the device of Figs. 5 and 6, taken along the line 7—7 of Fig. 6.

The symmetrically centered convex shoe finds particular utility in the device of Figs. 5 to 7 wherein the entire powerhead is pivoted for lateral movement with respect to the handle-positioned axle and wheels. A convenient way to adjust the pivoted powerhead includes Bowden wire control elements 54, 55 mounted on the handle 14 and connected with the housing extension 19 at opposite sides of the fulcrum bolt 16. At their upper ends the control wires connect to levers 56, 57, respectively, these levers being fulcrumed at 58 and associated with the grips 59, 60 at the upper end of the handle. By pulling the lever 57 toward the associated grip 60 within the clasp of the operator's hand, the operator can cause the entire powerhead to swing bodily to one side about the fulcrum bolt 16 in the manner indicated in Fig. 5, where the lever 57 has been drawn toward grip 60 to swing the powerhead to the left as viewed from the position of the operator. This enables trimming to be done beyond the path of the lefthand wheel 10. By relaxing the pressure on the control lever 57 and correspondingly pressing control lever 56 toward handle grip 59, the entire powerhead may be swung to the right toward the position indicated in dotted lines in Fig. 5 to trim grass beyond the path of the righthand wheel. In all such swinging movements, the convex shoe moves as freely to the side as it moves forwardly or rearwardly and it has the same swiveled action in pivoting upon any minor irregularities in the turf which it may encounter in the course of its bodily swinging movement. For this purpose, in particular, it functions much more effectively than a caster which would require time to change its position and which, in swivelling, tends to create a degree of unbalance. In all positions, the convex skid herein disclosed is invariably centered beneath the axis of the shaft upon which the cutter bar and blades rotate.

Although desirable, it is not essential that the supporting shoe coaxial with the cutting head be swiveled to the shaft. Fig. 8 shows an arrangement in which the shoe 451 and the baffle 461 are unitary, being mounted on a post 61 which extends through the tubular shaft 241 and does not rotate therewith, the post 61 being carried by a bracket 62 mounted by bolts 620 or the like on the top 17 of housing 15 and preferably integral with the shaft bearing sleeve 211. If desired, the shoe 451 and shaft 61 may be mounted for the swivelling movement which is regarded as important for reasons already described. This may conveniently be done by mounting a bearing race 63 in bracket 62 and screw threading the inner race 64 to the upper end of post 61. The inner race may be provided with a terminal nut at 65, whereby it may be held while a wrench is applied to the squared extremity 66 of post 61 to adjust the post and the shoe supported thereby upwardly and downwardly for varying the clearance between the ground and the mowing head. A lock nut 67 may be used to maintain the adjustment. Ball bearings 68 between the races 63 and 64 facilitate the swivel movement.

Figs. 9, 10 and 11 relate to a feature of the invention which is particularly usable in conjunction with the swinging cutting head disclosed in Figs. 5 and 6, but is also adaptable to other mowers of this general type.

The housing 152 is identical in form with those already described but is provided in one or both of its sides with a door or gate 70 which may be opened and closed in any desired manner to expose the lateral opening 71. In the preferred construction illustrated, the gate is hinged to the housing at 72 and has a flange 73 overlying the housing top wall 152 and slotted at 74 to receive a bolt 75 mounted on the housing. The bolt is provided with a wing nut 76 overlying the flange 73 for securing it in adjusted position.

The use of the door or gate is only necessary where some sort of a guard for the opening 71 is required. In other words, where safety does not require the use of the guard or gate 70, this can be omitted completely, leaving the opening 71 fully exposed.

It might be supposed that an air blast set in motion by the rapidly rotating blades would escape through the opening 71. However, the opening does not extend clear to the top of the housing 152 and, particularly where a special blade is used, there is actually a considerable influx developed at the opening 71 which draws into the housing any tall stems of grass or weeds which are laterally adjacent the housing and which would not otherwise be accessible to the blades. For the sake of safety, and also in order to develop maximum velocity of the incoming air current, it is preferred that the opening 71 should not extend through too great an arc. In practice, I have found it satisfactory to make the angular extent of the opening 71 small enough so that the chord subtended by the angle will not intersect the path of movement of the blades.

The special form of blades shown in Fig. 10 greatly increases the current of air drawn in through the opening 71. This blade 482 has its outer end 77 leading its inner end in the direction of blade rotation, the direction being preferably clockwise as viewed in Fig. 9 and Fig. 10. The rear margin 78 of the blade is not only turned upwardly rather sharply to lift the air, but it also has a distinct rake or backward inclination from its outer margin 79 to its inner end 80 so that it acts on the air in such a direction as to move inwardly toward the center of the housing the air which it encounters.

Through the use, in combination, of a housing with a lateral inlet and blades which accelerate an air current inwardly through such inlet, the mower is adapted to do trimming work heretofore deemed impossible with mowers of this type. Hand trimming may be completely eliminated, for the mower will draw in and cut grass or weed stems or leaves which may be in direct contact with fixed obstacles such as trees, tombstones, fences or buildings.

Fig. 12 exemplifies but one of numerous possibilities in the way of supporting a cutting head equipped with the swivel shoe of this invention at the end of an arm connected with a wheeled frame of some sort. The showing is purely diagrammatic to illustrate the point. The frame 82 is provided with wheels 83 and 84 and guided by handle 85. Suitably mounted thereon is a prime mover 86 connected to a jack shaft 87 which may be equipped at intervals with pulleys 88. Arms 89, 90 carrying the respective cutting heads 15 as above described may be pivoted directly on the jack shaft 87. The pulleys 25 of the respective cutting heads may be driven by belts 91, 92, of differing length according to the length of the respective arms 89, 90, which desirably arrange the cutting heads in slightly staggered relationship so that collectively they will mow substantially the entire width of the surface traversed by the frame 82. The respective arms 89, 90 are pivotally supported at their forward ends from frame 82 by means of the shaft 87 which acts as a pintle. At their rear ends, the arms and the cutting heads 15 connected therewith, float upon the terrain traversed, being supported by their respective swiveled shoes which may correspond with any of the constructions illustrated in Figs. 2, 4 or 8.

I claim:

1. In a lawn mower of the type comprising an upright shaft, a transverse cutter arm and a cutting blade mounted on such arm, the combination with such shaft, of a convex shoe and a pivotal mounting for said shoe on which it is disposed for ground contact substantially axially of the shaft and independent of shaft rotation for the support of said arm and blade from the surface traversed.

2. The combination set forth in claim 1 in further combination with adjustable spacing means for varying the axial distance between said shoe and said arm.

3. A mower of the character described comprising the combination with a generally cylindrical housing and a shaft provided with bearings for rotation substantially axially thereof, of a ground support pivoted directly to the shaft and having ground contact substantially axially of the shaft, a transverse bar carried by the shaft, and a sickle blade carried by the bar and rotatable on a path around said support.

4. The device of claim 3 in further combination with adjustable spacing means for varying the distance between said support and said bar, the said bar having a fixed position axially of said shaft respecting said housing.

5. The device of claim 4 in which said support comprises a downwardly convex shoe provided with a bearing in said shoe in which said shaft is rotatable.

6. A mower of the character described comprising the combination with a housing having a generally cylindrical wall and a delivery opening, of a shaft provided with a bearing centrally in said housing, a bar carried by the shaft and provided with free ends having sickle blades diametrically disposed respecting the axis of the shaft, a bearing adjacent the lower end of the shaft below said bar, and a coaxial ground support comprising a shoe carried by said bearing, whereby said shaft is swiveled respecting the shoe, the said shoe being downwardly convex for ground contact coaxially with said shaft.

7. The combination with a housing and a tubular shaft journaled therein in an upright position, of a sickle arm mounted on the shaft for rotation in the housing, a sickle blade carried by the arm, a wheeled support remote from said shaft, a rod extending through the shaft, and a shoe carried by the rod below said arm and positioned for ground engagement substantially on the axis about which said arm rotates with said shaft, said shoe being swiveled for relative rotation between the shaft and shoe and being adapted for the support of said shaft and arm at a predetermined ground clearance.

8. The device of claim 7 in combination with means for fixing the adjustment of said rod axially respecting the shaft whereby to vary such clearance.

9. In a lawn mower having three point support, the combination with an assembly comprising a pair of wheels constituting two of said support points, said wheels having axle means, a guiding handle connected with said assembly, and fulcrum means on said assembly, of a cutting head pivoted on said fulcrum means and disposed forwardly therefrom for oscillation from side to side respecting said assembly, said head including an upright shaft with a convexly bottomed swiveled ground support constituting the third point, a transverse sickle bar carried thereby and provided with sickle blade means, and a guard enclosing the path of said blade means.

10. The combination set forth in claim 9 in further combination with means for mechanically adjusting the said cutting head pivotally respecting the assembly and guiding handle.

11. In a power mower, the combination with a wheel and axle assembly and a guiding handle connected therewith, said assembly being centrally provided with an upright fulcrum, of a housing unit pivoted on said fulcrum and thereby connected with said assembly, said housing unit comprising a generally cylindrical guard wall disposed forwardly of said fulcrum, an upright shaft disposed within said wall, sickle blade means mounted on the shaft to rotate within the wall, a prime mover mounted on said unit and provided with driving connections to said shaft, means for oscillating said housing unit respecting said assembly, and a rotative convex skid coaxial with said shaft which supports said housing in any position of oscillation.

12. The combination set forth in claim 11 with means upon said handle for oscillating the housing unit respecting said assembly.

13. The combination set forth in claim 12 in which said oscillating means comprises a lever, a grip on said handle with which said lever is associated, and motion transmitting connections from said lever to said unit at one side of the fulcrum aforesaid.

14. In a device of the character described, the combination with a wheel and axle assembly provided with a guiding handle and having an upright fulcrum, of a housing unit pivoted on said fulcrum and comprising an upright shaft forwardly of the fulcrum, and a guard wall about said shaft, a sickle bar disposed transversely of the shaft and provided with blade means rotatable within the wall, a shoe coaxial with the shaft and with respect to which said shaft is rotatable, said shaft having a bearing in said shoe, and means for determining the angular position of said housing unit respecting said assembly.

15. The combination set for in claim 14 in which said angular position determining means comprises a pair of levers on said handle, a pair of wires connecting the respective levers with opposite sides of the housing unit and a pair of hand grips on said handle with which the levers are respectively associated.

16. In a device of the character described, the combination with a tubular shaft, of a transverse sickle bar and blade means mounted on the shaft for rotation, a rod extending through the shaft and axially adjustable with respect thereto, and a convex shoe mounted on the rod beneath the shaft, said shoe and shaft are provided with bearing means permitting the shoe to swivel respecting the shaft and substantially coaxially therewith, said shoe having ground contact substantially axially of the shaft.

17. The device of claim 16 in which the rod is connected to rotate with the shaft and constitutes an extension part thereof having a bearing in said shoe.

18. The device of claim 16 in which the rod is unitarily connected with the shoe and provided with a bearing independently of the shaft in which the rod and shoe swivel respecting the shaft.

19. In a device of the character described, the combination with an upright shaft provided with a sickle bar and blades at the respective ends thereof, of a downwardly convex shoe provided with a central bearing in which said shaft is rotatable.

20. In a mower of the rotary sickle type, the combination with a blade provided with a mounting for rotation, a housing of generally circular form in plan enclosing the path of blade rotation and provided with a delivery channel, said housing having at one side an inlet port for receiving material to be cut by said blade.

21. In a mower of the rotary sickle type, the combination with a wheeled frame adapted to be advanced in a given direction and comprising a housing having a generally cylindrical wall and a delivery outlet, said housing having a lateral inlet port substantially 90° offset from the direction of advance, a shaft rotatable centrally in the housing, a sickle bar carried by the shaft, and a cutting blade mounted on the sickle bar for rotation past said port.

22. The device of claim 21 in which the angular extent of said port is so limited that a chord of said housing subtending the angular extent of the port substantially clears the path of movement of said blade.

23. The device of claim 21 in which said blade has an upturned fan portion with a rearward rake from its outer end inwardly whereby to give an inward and upward impetus to air received through said port.

24. In a device of the character described, a mobile housing with a generally cylindrical wall having a wheeled support for advance in a given direction and provided with a rearwardly directed channel for the delivery of air and clippings, said wall having a lateral inlet port of less height than the wall, a shaft substantially centered in the housing with an upright axis, sickle arms carried by the shaft and symmetrically disposed blades carried by said arms to rotate within the housing adjacent said wall, the said blades being provided with cutting edges and with upturned rear marginal portions constituting fans, said upturned portions having a rearward rake from their outer ends inwardly whereby air engaged thereby will be urged both inwardly and upwardly, whereby an inward current through said lateral inlet port will be established by the movement of said blades to draw pneumatically into such port stems and leaves to be severed by such blades.

25. The device of claim 24 in which said port is provided with a guard.

26. The device of claim 24 in which said port is provided with a guard, said guard comprising a door for opening and closing the port and provided with an adjustable connection with the housing for predetermining the position of the door respecting said port.

27. In a device of the character described, the combination with a wheeled frame, of a rotary mowing head, an arm pivotally connecting such head with the frame, said frame having horizontal pintle means about which said arm is vertically oscillatable, said head including a housing connected with the arm, an upright cutter shaft rotatable within the arm, and a sickle blade connected with such shaft and disposed within the housing, and a ground support coaxial with the shaft and extending therebeneath and upon which said head floats in its oscillation upon said pintle means.

28. A device of the character described comprising a powerhead including a housing with an annular wall, an axial cutter shaft rotatable in the housing and provided with an arm and a cutter blade, a shoe swiveled beneath said shaft and substantially coaxially therewith to engage the ground on the axis of cutter shaft rotation for determining the spacing of said blade therefrom, and an arm connected with said housing and provided at a point remote therefrom with a fulcrum upon which said arm and housing are movable.

29. The combination set forth in claim 28 in further combination with a wheeled frame connected with said fulcrum and supporting the fulcrumed end of the arm and provided with a prime mover having driving connections to said shaft.

30. A mower comprising the combination with a wheeled frame having transverse pintle means, of a set of arms extending rearwardly from said pintle means and individually oscillatable in vertical planes with respect thereto, mowing heads floating at the ends of said arms and staggered to mow lapping paths behind said frame, ground supports individually carrying the respective mowing heads, and a prime mover mounted on said frame and operatively connected to drive the respective heads at the ends of said arms.

31. The device of claim 30 in which each of said heads comprises an annular housing wall, an upright shaft centered therein, sickle blade means carried by said shaft, and a shoe substantially coaxial with said shaft for ground contact substantially axially of the shaft.

32. The device of claim 31 in which said shoe is swiveled to afford shaft rotation independently of the shoe.

WINSTON S. WATROUS.

References Cited in the file of this patent

UNITED STATES PATENTS

| Number | Name | Date |
|---|---|---|
| 338,674 | Norris | Mar. 23, 1886 |
| 1,022,291 | Anthony | Apr. 2, 1912 |
| 1,336,257 | Muzzy | Apr. 6, 1920 |
| 1,447,606 | Seymour | Mar. 6, 1923 |
| 1,992,494 | Lundin | Feb. 26, 1935 |
| 2,134,115 | Flammang | Oct. 25, 1938 |
| 2,194,617 | Scott | Mar. 26, 1940 |
| 2,203,198 | Junge | June 4, 1940 |
| 2,232,671 | Loder | Feb. 18, 1941 |
| 2,287,126 | Packwood | June 23, 1942 |
| 2,461,188 | Stoner | Feb. 8, 1949 |
| 2,476,394 | Webb et al. | July 19, 1949 |
| 2,488,140 | Phillips | Nov. 15, 1949 |
| 2,521,972 | Haglund et al. | Sept. 12, 1950 |
| 2,522,112 | Gilmour | Sept. 12, 1950 |
| 2,530,684 | Davis | Nov. 21, 1950 |
| 2,539,934 | Smith | Jan. 30, 1951 |
| 2,547,328 | Koch et al. | Apr. 3, 1951 |
| 2,547,540 | Roberts | Apr. 3, 1951 |
| 2,549,317 | Laughlin | Apr. 17, 1951 |

FOREIGN PATENTS

| Number | Country | Date |
|---|---|---|
| 37,045 | Germany | Mar. 4, 1886 |
| 376,441 | Great Britain | July 14, 1932 |
| 416,140 | Great Britain | Sept. 13, 1934 |